April 25, 1939.    R. W. JOHNSON    2,155,761
METERING VALVE
Original Filed June 29, 1936
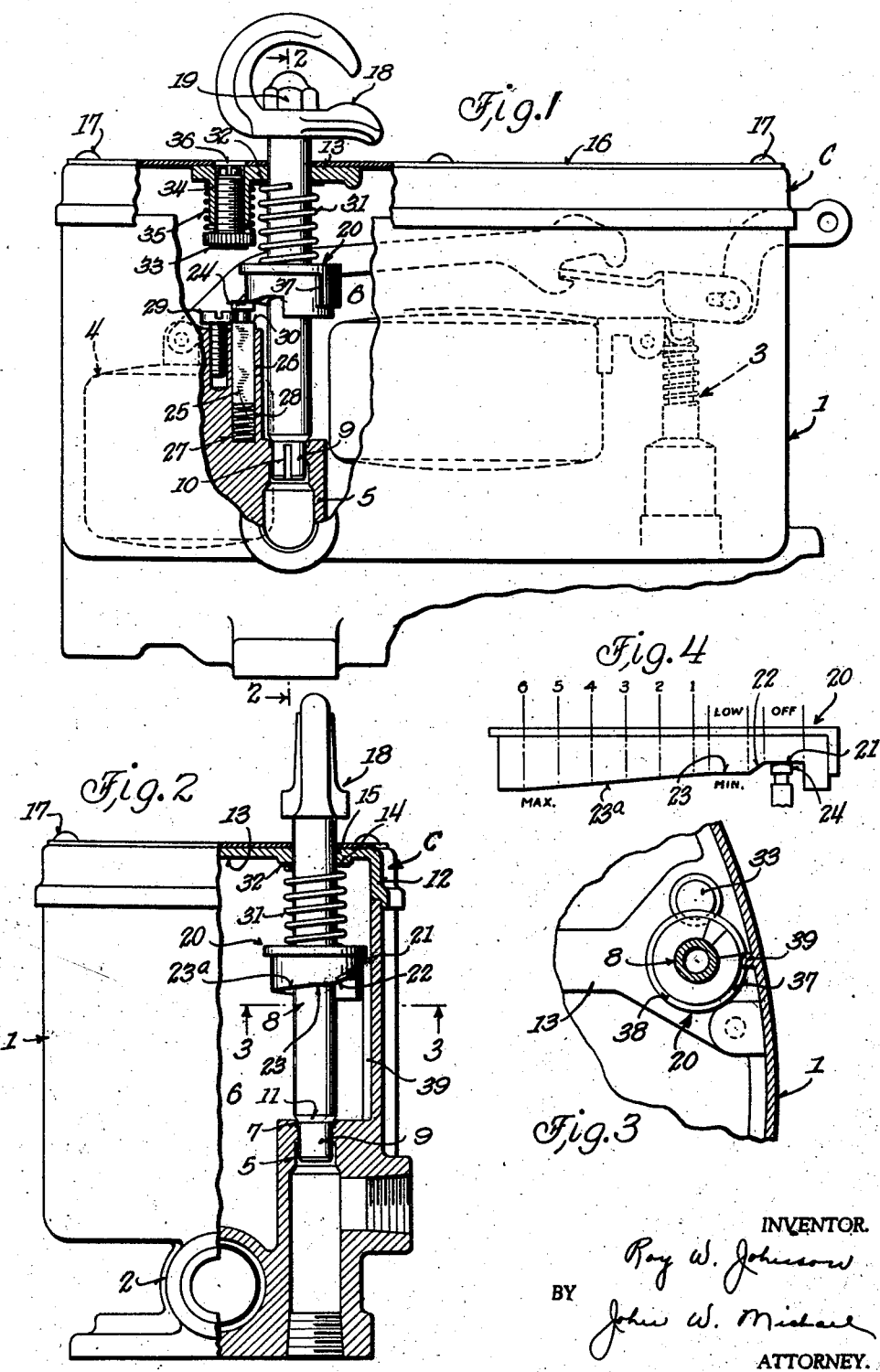
INVENTOR.
Roy W. Johnson
BY
John W. Michael
ATTORNEY.

Patented Apr. 25, 1939

2,155,761

UNITED STATES PATENT OFFICE 2,155,761

METERING VALVE

Roy W. Johnson, Milwaukee, Wis.

Application June 29, 1936, Serial No. 87,987
Renewed March 11, 1939

2 Claims. (Cl. 251—132)

This invention relates to an improvement in valves of the type employed for controlling the flow of liquid, such as oil or other fluid, from a constant level device to an oil burner.

Among the objects of the invention is to provide a valve of this character which maintains a definite low fire position of the metering stem of the valve thereby eliminating carbonization in pot type burners. As the valve is moved from its closed or off position to its low fire position the movement is positive and of a definite amount. In other words, there can be no intermediate steps.

Another object is to provide a valve of this character which can be set for a suitable range of high fire positions.

Another object of the invention is to provide a valve of this character which has these advantages and capacities and is extremely simple in its construction, reliable and effective in operation, readily and easily manipulated, and susceptible of economical manufacture and of easy installation.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a view partly in side elevation and partly in vertical section showing a construction embodying the present invention;

Figure 2 is a view in transverse vertical cross section taken on line 2—2 of Figure 1;

Figure 3 is a fragmentary view in horizontal cross section taken on line 3—3 of Figure 2; and Figure 4 is a diagram illustrating the contour of the active face of the valve operating cam.

Referring to the drawing, it will be seen that in the embodiment of the invention there illustrated, a casing 1 is provided. Fuel is supplied to the casing 1 through an inlet 2 from a reservoir (not shown) or other suitable source of supply. Within the casing 2 there is a float controlled inlet valve 3 equipped with an automatic safety cut-off 4. This structure will not be described in detail as it per se forms no part of the present invention and is fully disclosed and claimed in my U. S. Patent No. 2,120,364 issued June 14, 1938, for Devices for controlling the flow of fuel to oil burners and the like.

An outlet passage 5 is in direct communication with the main supply chamber 6 of the valve casing and is connected in any suitable way with the burner (not shown). At the upper or inner end of the valve passage a valve seat 7 is provided. A metering valve designated generally at 8 coacts with the outlet passage 5 and the valve seat 7 to control flow of liquid out through the outlet passage 5. This valve 8 is generally of cylindrical form and has its lower end portion 9 reduced and hollowed out and also provided with slots 10. Just above the reduced portion 9 the valve 8 has a beveled shoulder 11 which, in the closed position of the valve, bears against the seat 7 to shut off fuel out through the outlet passage. When the shoulder or valve face 11 is raised off the seat 7 flow is permitted through the slots 10 and the hollow interior of the lower end 9 of the valve.

The casing 1 is provided with a removable cover designated generally at C and comprising a flanged frame member 12 which fits over the upper edge of the casing and which is cross connected at at least one intermediate portion by an integral transverse bar-like member 13. The bar-like member 13 overlies the outlet passage and has one portion thickened as at 14 and provided with an opening 15 in which the upper portion of the valve is rotatably and slidably fitted and thereby guided. Removably secured to the frame-like member 12 of the cover is a name plate 16 which may be fastened in position by screws 17. When the screws 17 are removed the name plate may be readily taken off to provide for inspection or access to the parts within the casing 1. A finger piece or handle 18 is removably fixed in any suitable manner to the upper end of the valve, that is, to the part thereof that projects above the name plate 16. A nut 19 holds this handle or finger piece in position.

Fixed to the intermediate portion of the valve 8 is a cam 20 which is in the form of a collar fitted over the valve and suitably secured thereto. The undersurface of the cam 20 is shaped to provide the active face of the cam and to this end has an indentation 21 providing for the off or closed position of the valve, a sharply inclined portion 22 between the indentation 21 and the dwell 23, which latter provides for the low fire position of the valve. Beyond the dwell 23 the cam is slanted or angled as at 23ª to provide for the various high fire positions, as will be understood from Figure 4. The active surface of the cam bears against a headed cam pin 24 which has a shank 25 of non-circular cross section slidably fitted in a guideway 26 provided therefor in an internal boss 27 of the casing. This pin is urged upwardly by means of a rather stiff spring 28 interposed between its lower end and the bottom of the guideway 26. The extent to which it is moved upwardly by the spring and consequently its vertical position is determined by a screw 29 which is threaded into the boss 27 and has its head bearing against a shoulder 30 provided on the pin. The adjustment of the screw 29 determines the character of the low fire which is had when the low support or dwell 23 bears on the upper surface of the head of the cam pin 24. The cam is urged to bear against its pin 24 by means of a compression spring 31 encircling the upper portion of the valve stem and engaging the cam at its lower end and a washer 32 at its upper end, the washer bearing on the underside of the bar 13.

The maximum high fire valve adjustment available is provided by a screw 33, the head of which is positioned to engage the top of the cam 20 to limit upward movement of the valve. The shank of the screw is threaded into a tubular guide 34 integral with or fixed to the bar 13. A spring 35 which encircles the guide 34 and which is interposed between the bar 13 and the head of the screw tends to maintain the screw in any selected adjustment. The upper end of the screw 33 is slotted to facilitate its adjustment. If desired, the name plate may have an opening 36 to permit of access to the slotted upper end of the screw 33. However, the invention also contemplates having the name plate imperforate above the screw 33 to thereby necessitate removal of the name plate 16 for access to both the high and low fire adjustment screws. To limit the extent to which the valve may be rotated in either direction it is provided on its periphery with vertical stop shoulders 37 and 38 which are engageable with a stop 39 preferably in the form of a rib integral with the inner wall of the casing.

With a structure of this character a definite low fire position of the metering stem is had and carbonization of pot type burners is precluded. As the handle or finger piece 18 is turned the cam 20 goes directly from its off or closed position to the low fire position. There can be no intermediate steps. However, a full range of adjustments is provided for the high fire position of the valve.

The structure is simple and compact and yet is highly satisfactory and efficient in use.

While I have shown and described one construction in which the invention may be advantageously described, it is to be understood that this construction has been selected merely for the purpose of illustration or example and that various changes in the size, shape and arrangement of the parts may be made without departing from the spirit of the invention or the scope of the subjoined claims.

The invention claimed is:

1. A device of the character described comprising a casing having an oil supply chamber provided with an outlet, a metering valve having its lower end cooperable with the outlet to regulate flow therethrough, a collar fixed to the valve above its lower end and having an active cam face on its underside, a slidingly mounted pin co-operable with the cam face, a spring between the pin and the casing for urging the pin into engagement with the cam face and a screw threadedly interconnected with the casing and engaged with the pin to limit the extent of its movement toward the cam face, the spring also serving to cause the pin to engage the screw in such manner as to releasably secure it in any adjustment.

2. A device of the character described comprising a casing having an oil supply chamber provided with an outlet, a metering valve having its lower end cooperable with the outlet to regulate flow therethrough, a collar fixed to the valve above its lower end and provided on its underside with an active cam face, spring biased means on the casing cooperable with the cam face to cause the valve to open and close as it is turned, a spring between the casing and the collar for maintaining the cam face and said means in cooperative engagement, and an adjustable stop mounted on the casing and engageable with the upper side of the collar to limit the opening movement of the valve.

ROY W. JOHNSON.